July 5, 1960 V. A. MISEK 2,944,192

ELECTRONIC DECODING CIRCUIT

Filed April 22, 1954 2 Sheets-Sheet 1

Victor A. Misek

*INVENTOR.*

*BY* [signature]

Attorney

Victor A. Misek
*INVENTOR.*
*BY* [signature]
Attorney 2,944,192

ELECTRONIC DECODING CIRCUIT

Victor A. Misek, Nashua, N.H., assignor, by mesne assignments, to Sanders Associates, Incorporated, Nashua, N.H., a corporation of Delaware Filed Apr. 22, 1954, Ser. No. 424,937

7 Claims. (Cl. 315—198)

This invention relates to the art of electronic decoding devices. More particularly, the present invention relates to an electronic decoding device that responds to a specific series of pulses of electric energy.

It is often a problem in modern electronic decoding techniques to distinguish between signal pulses of energy that appear in a particular sequence and with different polarities. For example, it is necessary to decode the output of the high speed discriminator circuit widely used in doppler radar devices. In another application it may be desirable that with a sweep in a given direction a radar receiver will be sensitive to a time signal yet will not lock up on an image signal on the reverse sweep. In the specific problem from which this invention originated, it was desired to detect a succession of any pair of pulses whose polarity reversed in a given order.

It is an object of this invention to provide an improved electronic device for developing a control voltage in response to a signal having successive pulses of predetermined opposite polarities.

Other and further objects of the invention will be apparent from the following description of a typical embodiment thereof, taken in connection with the accompanying drawings.

In accordance with the present invention there is provided an electronic device for developing a control voltage in response to a signal having successive pulses of predetermined opposite polarities. A first gas discharge tube responds to a pulse of one predetermined polarity for developing a control voltage. A second gas discharge tube responds to a pulse of the same predetermined polarity for enabling the first tube for a fixed time interval greater than the duration of the pulse. A resistor and capacitor in combination maintain the first tube enabled for the time interval. Means are provided for impressing the signal pulses on the second tube. Means, for example a transformer, connected to the first tube are provided for inverting the polarities of the signal pulses and impressing the inverted pulses on the first tube. By virtue of this arrangement only a pulse of one predetermined polarity succeeded by a pulse of the opposite polarity during the fixed time interval effects the development of the control voltage by the first tube.

Figure 1:
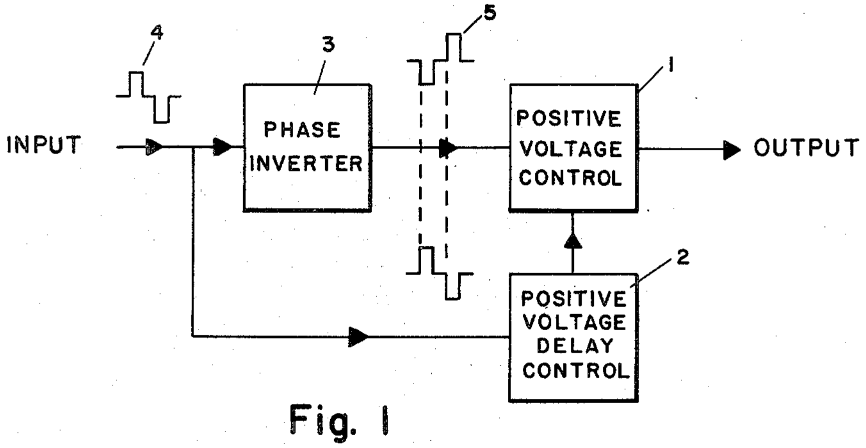
Fig. 1 is a schematic block diagram of an embodiment of the invention.

Referring now in more detail to the drawings, and with particular reference to Fig. 1, a positive voltage control 1 is connected in series with a positive voltage delay control 2. A phase inverter 3 is connected in series with the control 1. The input of the inverter 3 is connected to the input of the control 2, as shown. A signal, as illustrated at 4 having positive and negative voltage polarity pulses, is impressed on inverter 3, which produces an inverted pulse sequence, indicated at 5, which is applied to the control 1. The signal 4 is simultaneously applied to the delay control 2 which enables the voltage control 1 only in response to positive voltage pulses. The control 2 continues to enable the control 1 for a time interval greater than the duration of one of the pulses. In the embodiment illustrated, the control voltage is produced only in response to a positive pulse followed by a negative pulse during the predetermined time interval.

If a signal having a negative pulse followed by a positive pulse is impressed on the device it is rejected, i.e., no control voltage will be produced at the output. This effect is accounted for by the fact that the voltage control 1 is enabled only after a positive actuating pulse. A signal having voltage pulses of like polarities is also rejected since pulses of opposite polarities will always be impressed on the controls 1 and 2.

Figure 2:
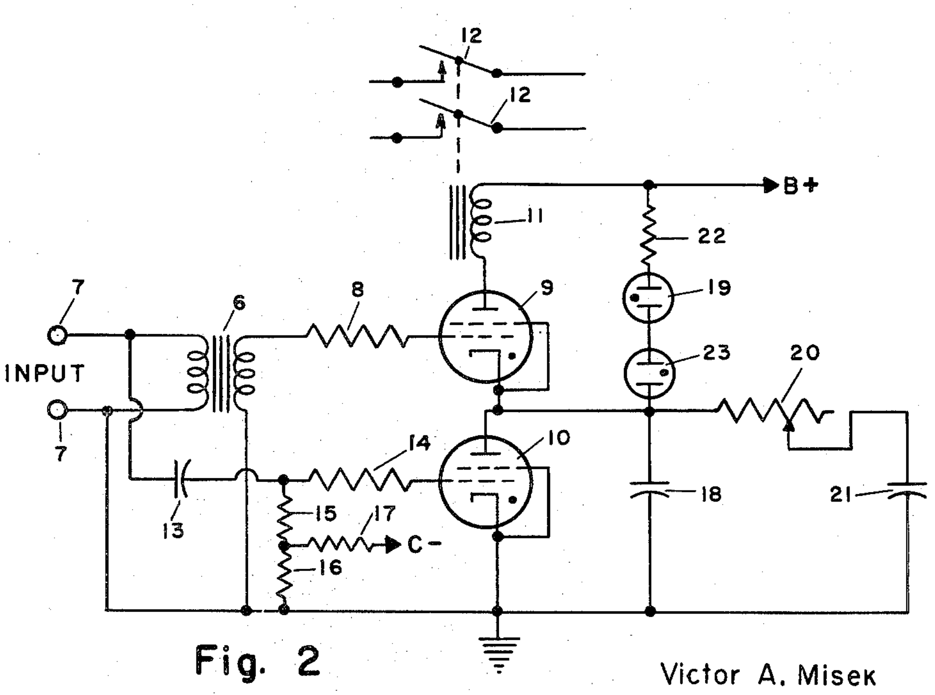
Fig. 2 is a schematic circuit diagram of one preferred embodiment of the present invention.

In Fig. 2 there is illustrated a detailed circuit diagram of the system. Here the phase inverter 3 comprises a transformer 6. The signal is impressed upon the terminals 7 of the primary of transformer 6. One side of this transformer primary is grounded as shown. The inverted signal appears across the secondary of the transformer, of which one side is also grounded. The other end of the transformer secondary is connected through a grid resistor 8 to the control grid of a tetrode gas discharge tube 9. The positive voltage control includes the tube 9 and its associated components. The second grid of tube 9 and its cathode are connected together to the plate of another tetrode gas discharge tube 10. The plate of tube 9 is connected through the inductance of a control relay 11 to a source of relatively high positive voltage labeled B+ (for example +200 volts D.C.). Contacts 12 of relay 11 effect desired external electrical connections or controls.

The positive voltage delay control 2 includes the tube 10 and its associated components. The input signal is coupled through a capacitor 13 and grid resistor 14 to the control grid of the tube 10 and appears across voltage dividing resistors 15 and 16. A negative bias voltage, for example —10 volts, is applied to the control grid of the tube 10 from a source of relatively low negative voltage labeled C—, for example — 20 volts. The desired bias voltage is developed across the resistor 16 through a voltage dropping resistor 17 in series, and is applied to the grid through resistors 15 and 14. The cathode and second grid of the tube 10 are grounded as shown. The voltage across the tube 10 is provided by capacitor 18 which is charged positively with respect to ground through neon bulbs 19 and 23 and a voltage dropping resistor 22 in series with the source B+. The bulbs 19 and 23 prevent the voltage across capacitor 18 from exceeding a predetermined maximum, for example +70 volts. In parallel with capacitor 18 is connected a time delay circuit comprising a variable resistor 20 and capacitor 21. It is to be understood that the circuit of Fig. 2 is for illustrative purposes only. The voltage control devices as generally indicated in Fig. 1 can be any of the well known electrical or electronic control devices together with the necessary delay circuit.

Figure 3:
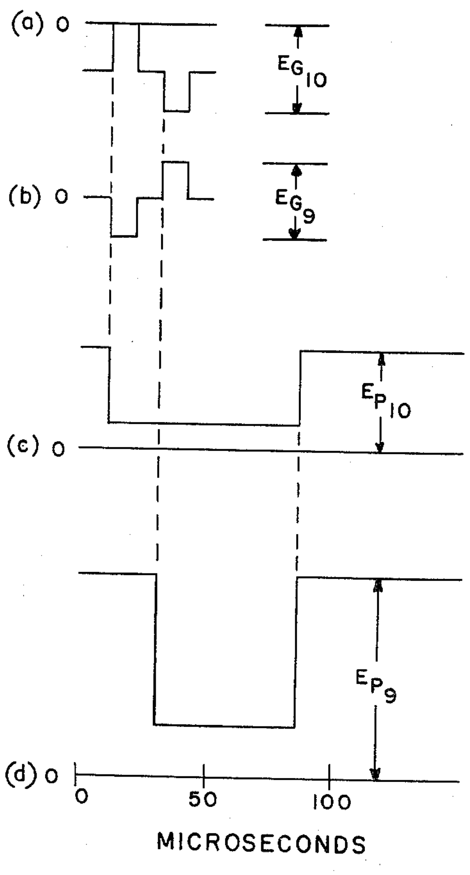
Fig. 3 is a group of the voltage wave forms associated with the embodiment of Fig. 2, illustrating the operation of the system with respect to an acceptable signal.
Figure 4:
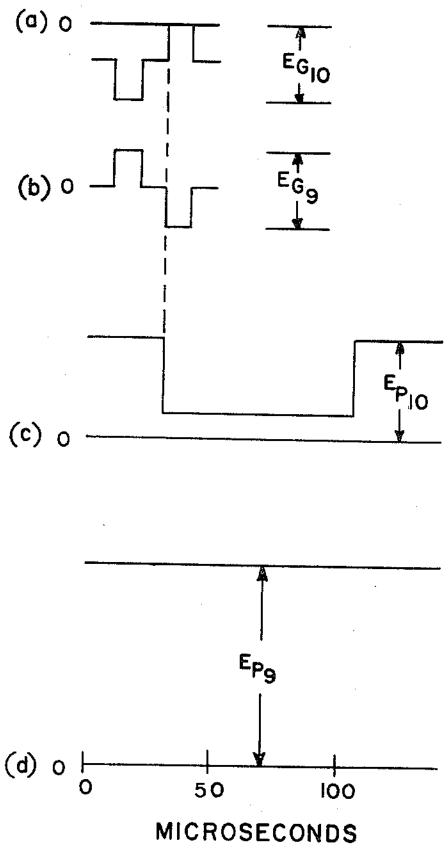
Fig. 4 is a group of similar voltage wave forms illustrating the operation of the system with respect to an unacceptable signal.

The operation of the device may be better understood with reference to the graphs of Figs. 3 and 4. In Fig. 3 the curves illustrate the voltage variations associated with the device that occur in response to an acceptable signal. Having impressed a signal as shown in the curve (*b*) on the input terminals 7, the signal is coupled through capacitor 13 and resistor 14 to the grid of the tube 10 and appears across the resistors 15 and 16 to ground. The control grid to ground voltage of the tube 10 is labeled $E_{G_{10}}$ as shown in the curves (*a*) of Figs. 3 and 4. The plate to ground voltage of that tube is labeled $E_{P_{10}}$ as shown in the curves (*c*) of Figs. 3 and 4. The positive pulse overcomes the negative bias on the control grid of that tube, thereby permitting the tube 10 to discharge and conduct normally. Ordinarily, the capacitor 18 would discharge through the tube 10 in a very short time to extinguish that tube and discontinue conduction of current through it. Capacitor 21, however, discharges through resistor 20 to maintain the tube 10 discharging for a time interval which is a function primarily of the values of the resistor 20 and capacitor 21.

The signal is inverted by the transformer 6 and applied through resistor 8 to the control grid of tube 9. The control grid to ground voltage of that tube is labeled $E_{G_9}$ and its plate to ground voltage is labaled $E_{P_9}$. The tube 9 can not discharge and conduct current unless the tube 10 is conducting. Due to the extended conduction time of the tube 10, the succeeding positive pulse that appears at the grid of the tube 9 causes that tube to discharge and conduct current. A control voltage is thus developed across the relay 11 to energize it and close its contacts 12.

An input signal having a voltage pulse of negative polarity followed by a pulse of positive polarity, as illustrated in Fig. 4, will be rejected by this device. The positive pulse which actuates the tube 10 occurs at a later time than the positive pulse which is impressed on the tube 9. Thus, at the time the positive pulse is applied to the tube 9, the tube 10 is nonconducting and precludes the tube 9 from discharging. During the period the tube 10 conducts, the voltage impressed on the tube 9 is negative and can not, of course, cause that tube to discharge.

Typical values for the components of the preferred embodiment may be chosen as follows: transformer 6—high fidelity audio transformer to pass 0 to 200,000 cycles per second; resistor 8—910,000 ohms; tubes 9 and 10—2D21; relay 11—plate relay having a coiled resistance of 10,000 ohms; capacitor 13—.001 microfarad; resistor 14—910,000 ohms; resistor 15—240,000 ohms; resistor 16—100,000 ohms; resistor 17—100,000 ohms; capacitor 18—.0015 microfarads; resistor 20—50,000 ohms; capacitor 21—.06 microfarad; resistor 22—240,000 ohms; and neon lamps 19 and 23—NE2.

The use of the present invention greatly enhances the art of encoding and decoding signal information.

While there has been hereinbefore described what is at present considered a preferred embodiment of the invention, it will be apparent that many and various changes and modifications may be made with respect to the embodiment illustrated, without departing from the spirit of the invention. It will be understood, therefore, that all those changes and modifications as fall fairly within the scope of the present invention, as defined in the appended claims, are to be considered as a part of the present invention.

What is claimed is:

1. A decoding circuit responsive only to an input signal characterized by a positive voltage portion followed by a negative voltage portion comprising first and second gas discharge tubes each having anode, control grid and cathode electrodes, a source of direct voltage having positive and ground terminals, a cascode circuit serially connecting the anode-cathode discharge paths of said tubes across said direct voltage source and providing a junction between said cathode of said first tube and said anode of said second tube, a voltage divider comprising a non-linear impedance means, a resistor and a capacitor serially connected between said positive and ground terminals in the order stated, a connection joining the junction of said impedance means and said resistor with the junction of said cathode of said first tube and said anode of said second tube, a negative bias voltage for said grid of said second tube, a substantially ground bias voltage for said grid of said first tube, means for applying said input signal to said grid of said second tube, and means for applying to said grid of said first tube a signal obtained by phase inverting said input signal.

2. A decoding circuit responsive only to an input signal characterized by a positive voltage portion followed by a negative voltage portion comprising first and second gas discharge tubes each having anode, control grid and cathode electrodes, a source of direct voltage having positive and ground terminals, a circuit serially connecting the anode-cathode discharge paths of said tubes with the same polarity across said direct voltage source, a voltage divider comprising a two electrode gas discharge tube, a resistor and a first capacitor serially connected between said positive and ground terminals in the order stated, a connection joining the junction of said two electrode gas discharge tubes and said resistor with the junction of said cathode of said first tube and said anode of said second tube, a second capacitor connected from said connection to said ground terminal, a negative bias voltage for said grid of said second tube, a substantially ground bias voltage for said grid of said first tube, means for applying said input signal to said grid of said second tube, a phase inverter, means for applying said input signal to said phase inverter and means for applying to said grid of said first tube the output of said phase inverter.

3. A decoding circuit responsive to an input signal characterized by a positive voltage portion followed by a negative voltage portion comprising first and second gas discharge tubes each having anode, control grid and cathode electrodes, a source of direct voltage having positive and ground terminals, a cascode circuit serially connecting the anode-cathode discharge paths of said tubes across said direct voltage source and providing a junction between said cathode of said first tube and said anode of said second tube, a voltage divider comprising a non-linear impedance means, a resistor and a capacitor serially connected between said positive and ground terminals in the order stated, a connection joining the junction of said impedance means and said resistor with the junction of said cathode of said first tube and said anode of said second tube, a negative bias voltage for said grid of said second tube, a substantially ground bias voltage for said grid of said first tube, means for applying said input signal to said grid of said second tube with sufficient magnitude for said positive portion to initiate an anode-cathode discharge in said second tube, whereby the potential of said anode of said second tube and the cathode of said first tube are reduced to approximately ground potential, and means for applying to said grid of said first tube a signal obtained by phase inverting said input signal with sufficient magnitude for the inverted negative portion of said input signal to initiate an anode-cathode discharge in said first tube so long as said discharge in said second tube persists, said resistor and said capacitor having a time constant for sustaining said discharge in said second tube for a predetermined time interval including the time between said positive and negative portions of said input signal.

4. A decoding circuit responsive only to an input signal characterized by a positive voltage portion followed by a negative voltage portion comprising first and second discharge tubes each having anode, control grid and cathode electrodes, a source of direct voltage having positive and ground terminals, a cascode circuit serially connecting the anode-cathode discharge paths of said tubes across said direct voltage source and providing a junction between said cathode of said first tube and said anode of said second tube, a voltage divider comprising a non-linear impedance means, a resistor and a capacitor serially connected between said positive and ground terminals in the order stated, a connection joining the junction of said impedance means and said resistor with the junction of said cathode of said first tube and said anode of said second tube, a negative bias voltage for said grid of said second tube, a substantially ground bias voltage for said grid of said first tube, means for applying said input signal to said grid of said second tube, means for maintaining said second tube conductive for a predetermined time interval after said positive voltage portion of said input signal, and means for applying to said grid of said first tube a signal obtained by phase inverting said input signal.

5. A decoding circuit responsive only to an input signal characterized by a positive voltage portion followed by a negative voltage portion comprising first and second discharge devices having input and output circuits, means for biasing said second device below cut-off, means for coupling said input signal to said input circuit of said second device with sufficient magnitude for said positive portion to initiate current flow in said second device, means for sustaining said current flow in said second device for a time interval at least as long as the interval including said positive and negative portions, means for reducing the effective bias on said first device during said current flow, a phase inverter, means for coupling said input signal to said phase inverter and means for coupling the output of said phase inverter to said input circuit of said first device with sufficient magnitude for said negative portion after inversion in said phase inverter to initiate current flow in said first device only when said effective bias is reduced and utilization means responsive to current flow in said first device.

6. A decoding circuit responsive to an input signal characterized by a positive voltage portion followed within a predetermined interval by a negative voltage portion comprising first voltage control means normally unresponsive to said input signal, second voltage control means normally responsive to said positive portion of said input signal, means for applying said input signal to said second voltage control means, means for applying to said first voltage control means a signal obtained by phase inverting said input signal and circuit means including said second voltage control means for rendering said first voltage control means responsive to the negative portion of said input signal for a predetermined time interval after said positive voltage portion of said input signal.

7. A decoding circuit responsive only to an input signal characterized by a direct voltage portion of a first polarity followed within a predetermined time interval by a direct voltage portion of a second polarity opposite to said first polarity, comprising a first voltage control means normally unresponsive to said input signal, a second voltage control means normally responsive to the first polarity portion of said input signal, means for applying said input signal to said second voltage control means, means for applying to said first voltage control means a signal obtained by phase inverting said input signal and circuit means including said second voltage control means for rendering said first voltage control means responsive to the second polarity portion of said input signal for a predetermined time interval after the first polarity portion of said input signal.

References Cited in the file of this patent

UNITED STATES PATENTS

| | | |
|---|---|---|
| 2,444,921 | Dawson | July 13, 1948 |
| 2,503,958 | Lyons | Apr. 11, 1950 |
| 2,530,931 | Alexander | Nov. 21, 1950 |
| 2,559,508 | Meier | July 3, 1951 |
| 2,566,309 | Brode | Sept. 4, 1951 |
| 2,597,082 | Hartwig | May 20, 1952 |
| 2,786,967 | Kuenning | Mar. 26, 1957 |